US008539063B1

(12) United States Patent
Sharma et al.

(10) Patent No.: US 8,539,063 B1
(45) Date of Patent: Sep. 17, 2013

(54) METHOD AND SYSTEM FOR CONTAINMENT OF NETWORKED APPLICATION CLIENT SOFTWARE BY EXPLICIT HUMAN INPUT

(75) Inventors: Rosen Sharma, Los Gatos, CA (US); Bakul Shah, Los Altos, CA (US); E. John Sebes, Menlo Park, CA (US)

(73) Assignee: McAfee, Inc., Santa Clara, CA (US)

( * ) Notice: Subject to any disclaimer, the term of this patent is extended or adjusted under 35 U.S.C. 154(b) by 1062 days.

(21) Appl. No.: 10/651,591

(22) Filed: Aug. 29, 2003

(51) Int. Cl.
*G06F 15/16* (2006.01)

(52) U.S. Cl.
USPC ........................................... 709/224; 709/227

(58) Field of Classification Search
USPC ......................................................... 709/229
See application file for complete search history.

(56) References Cited

U.S. PATENT DOCUMENTS

| 4,688,169 | A |   | 8/1987  | Joshi ............................. 364/200 |
|-----------|---|---|---------|--------------------------------------------|
| 4,982,430 | A |   | 1/1991  | Frezza et al. .................... 380/50   |
| 5,155,847 | A |   | 10/1992 | Kirouac et al.                             |
| 5,222,134 | A |   | 6/1993  | Waite et al. ....................... 380/4 |
| 5,390,314 | A |   | 2/1995  | Swanson ......................... 395/500   |
| 5,521,849 | A |   | 5/1996  | Adelson et al. ............... 364/570      |
| 5,560,008 | A |   | 9/1996  | Johnson et al. ............... 395/650      |
| 5,699,513 | A | * | 12/1997 | Feigen et al. .................... 726/11   |
| 5,778,226 | A |   | 7/1998  | Adams et al.                               |
| 5,778,349 | A |   | 7/1998  | Okonogi ........................... 707/1   |
| 5,787,427 | A |   | 7/1998  | Benantar et al.                            |
| 5,842,017 | A |   | 11/1998 | Hookway et al. ............. 395/707        |
| 5,907,709 | A |   | 5/1999  | Cantey et al. ................. 395/705     |
| 5,907,860 | A |   | 5/1999  | Garibay et al.                             |
| 5,926,832 | A |   | 7/1999  | Wing et al.                                |
| 5,974,149 | A |   | 10/1999 | Leppek                                     |
| 5,987,610 | A |   | 11/1999 | Franczek et al.                            |
| 5,987,611 | A |   | 11/1999 | Freund                                     |
| 5,991,881 | A |   | 11/1999 | Conklin et al.                             |
| 6,064,815 | A |   | 5/2000  | Hohensee et al.                            |
| 6,073,142 | A |   | 6/2000  | Geiger et al.                              |
| 6,192,401 | B1|   | 2/2001  | Modiri et al.                              |
| 6,192,475 | B1|   | 2/2001  | Wallace                                    |
| 6,256,773 | B1|   | 7/2001  | Bowman-Amuah                               |
| 6,275,938 | B1|   | 8/2001  | Bond et al.                                |

(Continued)

FOREIGN PATENT DOCUMENTS

| EP | 1 482 394 A2 | 12/2004 |
| EP | 2 037 657 A1 | 3/2009  |

(Continued)

OTHER PUBLICATIONS

Gutzmann, K., "Access control and session management in the HTTP environment", Internet Computing, IEEE vol. 5, Issue 1, Jan.-Feb. 2001 pp. 26-35.*

(Continued)

*Primary Examiner* — William Goodchild
(74) *Attorney, Agent, or Firm* — Patent Capital Group

(57) ABSTRACT

Method and system for containing networked application client software in order to perform specified transactions only given explicit consent of a legitimate user. In one embodiment, a confirmation interceptor intercepts a service request message, queries the user of the request for a confirmation, and then either passes the service request message onto server application software or drops the request, depending on the user's confirmation response. In soliciting and processing the confirmation response, query is formulated so that the required response cannot be automatically generated by software that attempts to automate and simulate the user's actions.

63 Claims, 6 Drawing Sheets

(56) References Cited

U.S. PATENT DOCUMENTS

| | | |
|---|---|---|
| 6,321,267 B1 | 11/2001 | Donaldson |
| 6,356,957 B2 | 3/2002 | Sanchez, II et al. .......... 709/328 |
| 6,393,465 B2* | 5/2002 | Leeds ........................ 709/207 |
| 6,442,686 B1 | 8/2002 | McArdle et al. ............. 713/151 |
| 6,449,040 B1 | 9/2002 | Fujita |
| 6,453,468 B1 | 9/2002 | D'Souza |
| 6,460,050 B1 | 10/2002 | Pace et al. |
| 6,587,877 B1 | 7/2003 | Douglis et al. ............... 709/224 |
| 6,611,925 B1 | 8/2003 | Spear |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman ........................ 717/126 |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,930,985 B1 | 8/2005 | Rathi et al. |
| 6,934,755 B1 | 8/2005 | Saulpaugh et al. |
| 6,988,101 B2 | 1/2006 | Ham et al. ...................... 707/10 |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2* | 5/2006 | Cartmell et al. ................... 726/6 |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2* | 11/2006 | Billingsley et al. ........... 713/182 |
| 7,152,148 B2 | 12/2006 | Williams et al. |
| 7,159,036 B2 | 1/2007 | Hinchliffe et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,330,849 B2 | 2/2008 | Gerasoulis et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,849,507 B1 | 12/2010 | Bloch et al. |
| 7,865,931 B1 | 1/2011 | Stone et al. |
| 7,908,653 B2 | 3/2011 | Brickell et al. |
| 7,937,455 B2 | 5/2011 | Saha et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,234,713 B2 | 7/2012 | Roy-Chowdhury et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1* | 7/2002 | Mastin Crosbie et al. ..... 705/500 |
| 2003/0014667 A1 | 1/2003 | Kolichtchak |
| 2003/0023736 A1* | 1/2003 | Abkemeier ..................... 709/229 |
| 2003/0033510 A1 | 2/2003 | Dice |
| 2003/0073894 A1 | 4/2003 | Chiang et al. ................. 600/407 |
| 2003/0074552 A1* | 4/2003 | Olkin et al. .................... 713/150 |
| 2003/0120601 A1 | 6/2003 | Ouye et al. |
| 2003/0120811 A1 | 6/2003 | Hanson et al. ................. 709/245 |
| 2003/0120935 A1 | 6/2003 | Teal et al. ...................... 713/188 |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1* | 1/2004 | Billingsley et al. ........... 713/182 |
| 2004/0015554 A1* | 1/2004 | Wilson .......................... 709/206 |
| 2004/0051736 A1* | 3/2004 | Daniell .......................... 345/752 |
| 2004/0054928 A1 | 3/2004 | Hall |
| 2004/0143749 A1 | 7/2004 | Tajalli et al. |
| 2004/0167906 A1 | 8/2004 | Smith et al. |
| 2004/0230963 A1 | 11/2004 | Rothman et al. .............. 717/168 |
| 2004/0243678 A1* | 12/2004 | Smith ............................ 709/206 |
| 2004/0255161 A1 | 12/2004 | Cavanaugh .................... 713/201 |
| 2005/0018651 A1 | 1/2005 | Yan et al. |
| 2005/0086047 A1 | 4/2005 | Uchimoto et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. ..................... 713/167 |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |

| | | |
|---|---|---|
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Matthias et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Xiaoxin et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0320140 A1 | 12/2009 | Sebes et al. |
| 2010/0071035 A1 | 3/2010 | Budko et al. |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0332910 A1 | 12/2010 | Qasim et al. |
| 2011/0029772 A1 | 2/2011 | Fanton et al. |
| 2011/0035423 A1 | 2/2011 | Kobayashi et al. |
| 2011/0047543 A1 | 2/2011 | Mohinder |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2012/0278853 A1 | 11/2012 | Chowdhury et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2012/015489 | 2/2010 |
| WO | WO 2011/059877 | 5/2011 |
| WO | WO 2012/015485 | 2/2012 |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, Retrieved and printed Oct. 12, 2009, 1 page.

Secure Mobile Computing, Website: http://www.vmware.com/solutions/desktop/mobile.html, Retrieved and printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

U.S. Appl. No. 12/640,098, entitled "Enforcing Alignment of Approved Changes and Deployed Changes in the Software Change Life-Cycle," filed Dec. 17, 2009, Inventor(s): Rahul Roy-Chowdhury, et al.

U.S. Appl. No. 12/839,856, entitled "Containment of Network Communication," filed Jul. 20, 2010, Inventor(s) E. John Sebes, et al.

U.S. Appl. No. 12/844,892, entitled "System and Method for Protecting Computer Networks Against Malicious Software," filed Jul. 28, 2010, Inventor(s) Rishi Bhargava, et al.

U.S. Appl. No. 12/844,964, entitled "System and Method for Network Level Protection Against Malicious Software," filed Jul. 28, 2010, Inventor(s) Rishi Bhargava, et al.

U.S. Appl. No. 12/880,125, entitled "System and Method for Clustering Host Inventories," filed Sep. 12, 2010, Inventor(s) Rishi Bhargava, et al.

U.S. Appl. No. 12/944,567, entitled "Classification of Software on Networked Systems," filed Nov. 11, 2010, Inventor(s) E. John Sebes, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,081, entitled "Method and System for Containment of Usage of Language Interfaces," filed Nov. 15, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

Barrantes et al., "Randomized Instruction Set Emulation to Dispurt Binary Code Injection Attacks," Oct. 27-31, 2003, ACM, pp. 281-289.

Gaurav et al., "Countering Code-Injection Attacks with Instruction-Set Randomization," Oct. 27-31, 2003, ACM, pp. 272-280.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Tal Garfinkel, et al., "Terra: A Virtual Machine-Based Platform for Trusted Computing," XP-002340992, SOSP'03, Oct. 19-22, 2003, 14 pages.

U.S. Appl. No. 13/012,138, entitled "System and Method for Selectively Grouping and Managing Program Files," filed Jan. 24, 2011, Inventor(s) Rishi Bhargava, et al. (04796-1055).

U.S. Appl. No. 13/022,148, entitled "Execution Environment File Inventory," filed Feb. 7, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

IA-32 Intel® Architecture Software Developer's Manual, vol. 3B; Jun. 2006; pp. 13, 15, 22 and 145-146.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Notification of International Preliminary Report on Patentability and Written Opinion mailed May 24, 2012 for International Application No. PCT/US2010/055520, 5 pages (04796-1047).

Sailer et al., sHype: Secure Hypervisor Approach to Trusted Virtualized Systems, IBM research Report, Feb. 2, 2005, 13 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.

G. Pruett et al., "BladeCenter systems management software", [Online], Nov. 2005, pp. 963-975, [Retrieved from Internet on Oct. 24, 2012], <http://citeseerx.lst.psu.edu/viewdoc/download?doi=10.1.1.91.5091&rep=repl&type=pdf>.

Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.

Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.

"What's New: McAfee VirusScan Enterprise, 8.8," copyright 2010, retrieved on Nov. 23, 2012 at https://kc.mcafee.com/resources/sites/Mcafee/content/live/PRODUCT_DOCUMENTATION/22000/PD22973/en_US/VSE%208.8%20-%20What's%20New.pdf, 4 pages.

"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.

Rivest, R., "The MD5 Message-Digest Algorithm", RFC 1321, Apr. 1992, retrieved on Dec. 14, 2012 from http://www.ietf.org/rfc/rfc1321.txt, 21 pages.

Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.

U.S. Appl. No. 13/728,705, filed Dec. 27, 2012, entitled "Herd Based Scan Avoidance System in a Network Environment," Inventor(s) Venkata Ramanan, et al.

* cited by examiner

METHOD AND SYSTEM FOR CONTAINMENT OF NETWORKED APPLICATION CLIENT SOFTWARE BY EXPLICIT HUMAN INPUT

BACKGROUND OF INVENTION

1. Field of Invention

The present invention relates generally to computer systems. More particularly, the present invention relates to explicit human input or confirmation for containing networked application client software.

2. Related Art

In a typical computer system, any software running on the system has full network access to, and the service usage of, any networked service or application that is needed directly or indirectly by users of the computer system. Furthermore, networked application client software is herein defined as software that makes use of network-accessible services by using network communication from the client host to the host(s) providing the service(s), and implementing the correct protocol for using such service(s).

Today, there exist numerous techniques for automating and simulating a user in order so networked application client software would specify, request, and use the aforementioned network-accessible services. Although such techniques as creating a human-input script or creating client software that utilizes the same application programming interface (API) as the user-interface software do provide many benefits, the same techniques may also be used to allow malicious or erroneous software to make service requests that are not intended by the user.

One solution to detect malicious usage of networked application client software is to use human interactive proofs. Conventionally, human interactive proofs have been used to gather human input with high assurance that input came from a human rather than software developed to simulate human input. However, human interactive proofs have thus far neither been used to detect whether application software operating on behalf of a user is functioning without the user's knowledge or authorization, nor used within an existing application workflow to obtain human confirmation for an application transaction request.

A second solution is to implement network firewalls that control the ability of networked application client software to send request to networked application server software. In one example of a firewall technique, a firewall acts as a "proxy" for client/server transmission control protocol (TCP) connections, that is, acts as a TCP connection endpoint for a connection with a client and a second connection for a server. A firewall may set up a dialogue with the user in order to notify the user that some software is attempting to traverse the firewall to the host that the user is using. The dialogue is considered successful if the user provides the information expected in the dialogues (e.g. a mouse click on an "OK" button rather than a mouse click on a "Cancel" or "Close" button). However, such dialogue techniques have not been used to provide any assurance of human participation in the dialogue, that is, the data entered on the user's side may well be provided via a script or other forms of automation.

SUMMARY OF INVENTION

Accordingly, the present invention provides a method and system for containing the capabilities of networked application client software so that it can perform specified transactions only given explicit consent or confirmation of a legitimate user. In one embodiment of the present invention, the consent from the user is obtained by means of dialogues with the user who is using the host executing the networked application client software. The dialogues are performed with one of several techniques for gathering human input, wherein the techniques are designed so it is extremely difficult for software to automate the user's responses to a dialogue, and much more difficult to automate the user's responses reliably for multiple arbitrary dialogues.

The present invention provides a method and system to reduce or eliminate the spread of malicious software via means such as electronic mail or internet messaging that include data attachments. The present invention prevents the spread of such malicious service usage attempts by intercepting a service request, notifying the user of the service request, and subsequently dropping the request if the user denies the request or does not confirm the notification.

The present invention may also be used to prevent unauthorized service usage wherein the service request comes from a non-legitimate user masquerading as a legitimate user. Moreover, the system of the present invention may be used to implement service on user demand in order to contain a workstation to a specific set of services where each channel through which the workstation communicates with a host in order to access a service has been explicitly authorized by a human user. Alternatively, the present invention may be used to implement access on demand to contain a server's usage of other services to only the services that the server needs.

BRIEF DESCRIPTION OF DRAWINGS

The accompanying drawings that are incorporated in and form a part of this specification illustrate embodiments of the invention and together with the description, serve to explain the principles of the invention.

DETAILED DESCRIPTION OF EXEMPLARY EMBODIMENT(S)

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
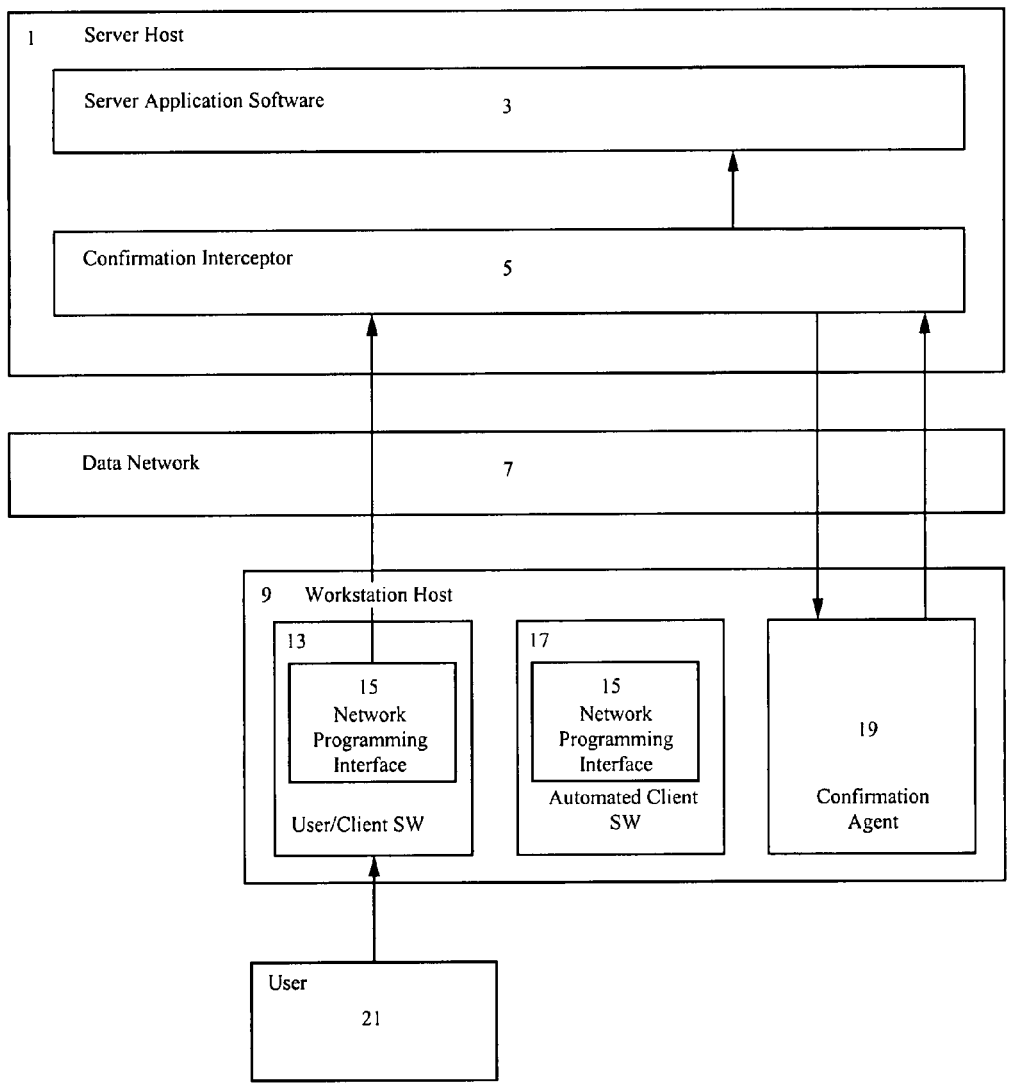
FIG. 1 is a block diagram comprising: a server host having server application software and a confirmation interceptor; a data network, a workstation host having user/client software, automated client software, and a confirmation agent; and a user, interacting in accordance to a first embodiment of the present invention.

FIG. 1 illustrates a block diagram 100 in accordance to a first embodiment of the present invention. Block diagram 100 comprises: a server host denoted 1, a data network denoted 7, a workstation host denoted 9, and a user denoted 21. The server host 1 further comprises server application software denoted 3 and a confirmation interceptor denoted 5. The workstation host 9 further comprises: user/client software denoted 13, automated client software denoted 17, and a confirmation agent denoted 19. The user/client software 13 and the automated client software 17 each in turn comprise a network programming interface denoted 15.

Furthermore, the server host 1 is herein defined as a computer that is running a service that may be used directly or indirectly by the user 21 via user/client software 13. The data network 7 is herein defined as an electronic medium used for communication between two or more computers, including communication between the server host 1 and the workstation host 9. The workstation host is herein defined as a computer used by the user 21 to execute client software and make use of services running on the server host 1. The server application software 3 is herein defined as software that runs on the server that implements one or more services. The confirmation interceptor 5 is herein defined as software that intercepts service requests and in some cases obtains user confirmation for service requests. The confirmation agent 19 is herein defined as software used to receive information from the confirmation interceptor 5 and implement a dialogue between the system and the user 21. For example, internet messaging (IM) software may be used as a confirmation agent 19 to provide interaction between the system and the user. The user/client software 13 is herein defined as software comprising user-interface software and client application software. The automated client software 17 is herein defined as software comprising client application logic (i.e. usage and network programming interface). The network programming interface 15 is herein defined as a set of data exchange protocols used to facilitate communication between the server application software 3 and client application software. Moreover, client application software is herein defined as software that runs on workstation host 9 and executes tasks that comprises: implementing an application's network programming interface, using the network programming interface to formulate service requests, sending the requests to the server host 1, and receiving responses from the server host 1 via the data network 7.

FIG. 1 illustrates one exemplary embodiment for containment of the capabilities of network application client software. The term containment as used in the description of this invention is herein defined as a mechanism for ensuring that for any designated service or any designated transaction of a designated service, a human user has provided explicit confirmation to process the service or the transaction.

A contained system observes several properties including: any software in the contained system can be prevented from using network-accessible services unless the use of such services results from human-originated actions; any software in the contained system can be prevented from using transactions implemented by a specific service unless the use of such transactions result from human-originated actions; and no autonomous software in the contained system can surreptitiously use services and/or transactions.

Moreover, the containment mechanism can be applied selectively to services based on the nature of the service and/or the nature of specific threats or possible harmful effects that could results from the service. For example, malicious software could spread via electronic mail or messaging that includes data attachments, therefore, whenever electronic mail with attachments is sent, the human user is asked to confirm the origin of the request. If malicious software attempts to spread to other hosts by sending itself via electronic mail, the user will be contacted to confirm that he/she has sent the message and its associated data attachment, and the malicious attempt would be thwarted when the human user denies the origin of the electronic mail.

Containment is accomplished in a system by controlling the ability of any software on a host system to use a communication conduit. A conduit is herein defined as a mechanism that has the ability to create a communication session from the local host system to a host system offering a service, wherein the session uses a communication channel for the service. For example, a common pair of conduits used by many workstation hosts are able to communicate over a conduit to a mail server using TCP and port 110 in order to access a POP3 service for receiving mail; the pair may also communicate over a conduit to a mail server using TCP and port 24 to access a simple mail transfer protocol (SMTP) service for sending mail.

An important aspect of conduits in practice is that most hosts have the ability to use a conduit to communicate with most services running on most other hosts. The number of such conduits is large and most of these conduits are rarely used but are available for accidental or intentional abuse with harmful results.

A system is considered contained if there is a containment mechanism that controls the usage of all conduits, and enables the conduits that are actually needed. In a contained system, control is applied both to the ability to make use of a conduit (to make requests for transactions implemented by the server), and to the ability to use conduits to make a specific request.

Referring now back to FIG. 1. As illustrated in FIG. 1, the user 21 interacts with the user/client software 13 in order to provide user data input that describes an application transaction that the user wants performed. Once the user/client software 13 receives the data input from the user 21, the user/client software 13 sends a service request message to the server application software 3 on the server host 1.

The service request message is passed from the workstation host 9 to the confirmation interceptor 5 via the data network 7. The confirmation interceptor 5 then intercepts the service request message and determines whether the requested transaction necessitates user confirmation.

If the requested transaction does require user confirmation to proceed, the confirmation interceptor 5 holds the service request message and sends a confirmation request message to one of several possible devices such as: a confirmation agent on workstation 9, a confirmation agent on a second workstation associated with the user 21, a communication device comprising a confirmation agent connected to the data network 7, or a communication device comprising a confirmation agent connected to a second data network. Although the confirmation interceptor 5 may send a confirmation request message to any of a number of possible devices such as those listed, the confirmation interceptor 5 shown in FIG. 1 sends the confirmation request message to the confirmation agent 19. Moreover, confirmation request message comprises information related to the confirmation requested of the user.

The confirmation agent 19 then displays a message to the user, wherein the displayed message prompts the user for the response that the confirmation interceptor requires in order to process the service and/or the transaction requested. Moreover, to obtain the required response, the confirmation agent 19 may query the user by one or more dialogues. The confirmation agent 19 then waits for a user response within a predefined time frame. If the confirmation agent 19 obtains a response within the time frame, the confirmation agent 19 sends the response data back to the confirmation interceptor 5 in the form of a confirmation status message.

Moreover, when the confirmation interceptor 5 receives the response data, the interceptor determines whether the response data is an acceptable confirmation reply. In one example, the confirmation interceptor receives an acceptable confirmation from the user to proceed with the request transaction and forwards the service request message to the server application software 3. Alternatively, if the confirmation interceptor 5 determines that one of the following is true: a) the response is not an acceptable confirmation response; or b) there is no response data; the confirmation interceptor 5 then drops the service request message instead of forwarding the message to the server application software 3.

Figure 2:
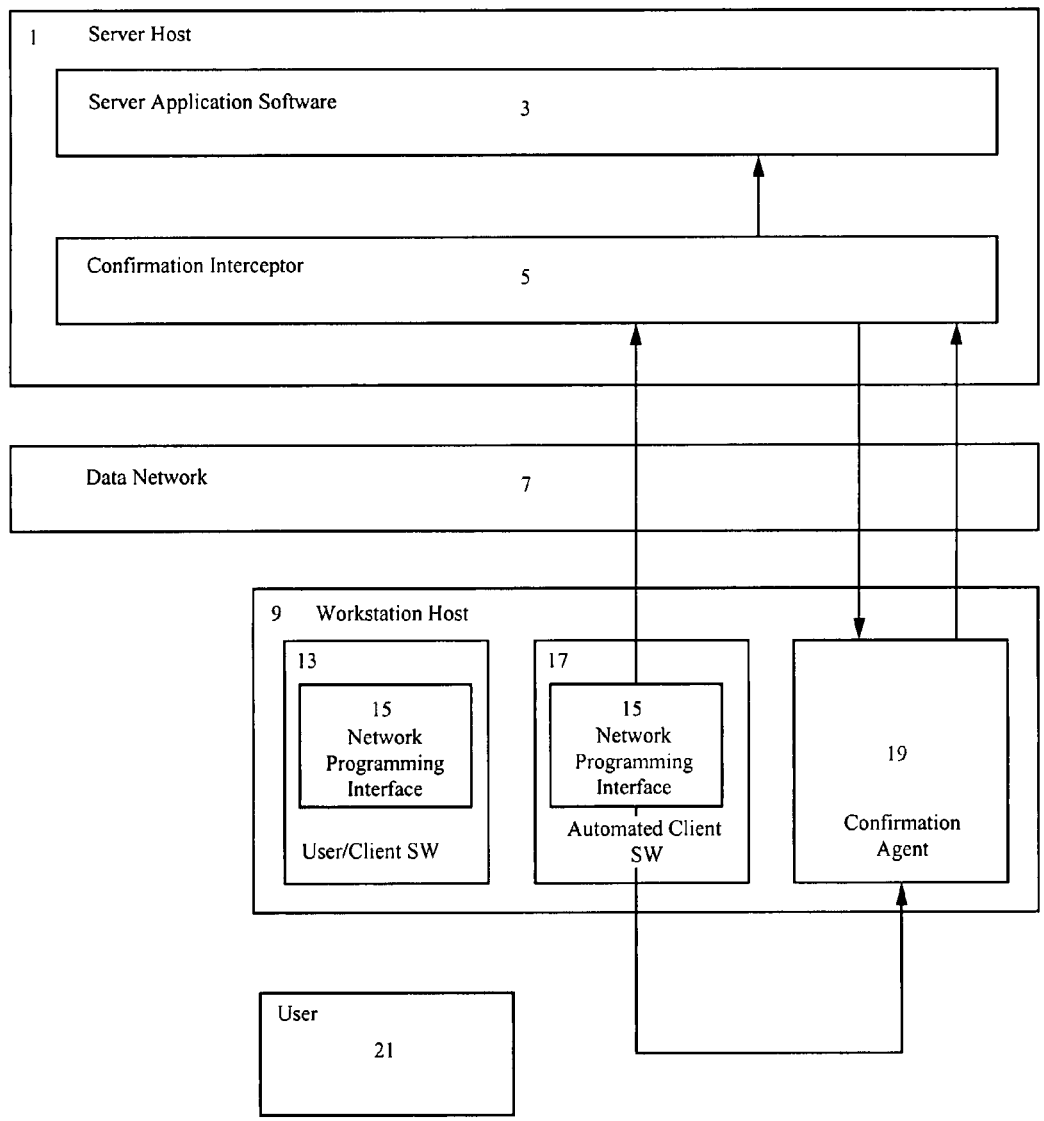
FIG. 2 is a block diagram comprising the same components as FIG. 1 wherein the components interact without the user in accordance to the first embodiment of the present invention.

FIG. 2 illustrates an alternative scenario to the embodiment shown in FIG. 1, whereas a service request message originates from the user 21 to the user/client software 13 in FIG. 1, a service request message originates from automated client software 17 and the service request message is then transmitted to the confirmation agent 19 without the knowledge of the user 21. In FIG. 2, the automated client software 17 provides the confirmation response to the confirmation agent 19 that sends the response data back to the confirmation interceptor 5 in the form of a confirmation status message. The confirmation interceptor 5 then determines that the response is unacceptable, because the required response is designed to not be computable from either the original request message (intercepted by the confirmation interceptor 5) or the confirmation agent 19's prompt for the confirmation response. Consequently, confirmation interceptor 5 drops the service request message. However, the confirmation interceptor 5 would forward the request to the server application software 3 if the user 21 becomes aware of the service request that originates from the automated client software 17, confirms the request with an acceptable response to the confirmation agent 19 which forwards the response data to the confirmation interceptor 5. In the embodiment of the present invention illustrated in FIG. 1 and FIG. 2, automated client software 17 is not prevented from seeing (or intercepting) the prompt for user confirmation, nor from attempting responses makes it infeasible for automated client software 17 to compute an acceptable response.

Figure 3:
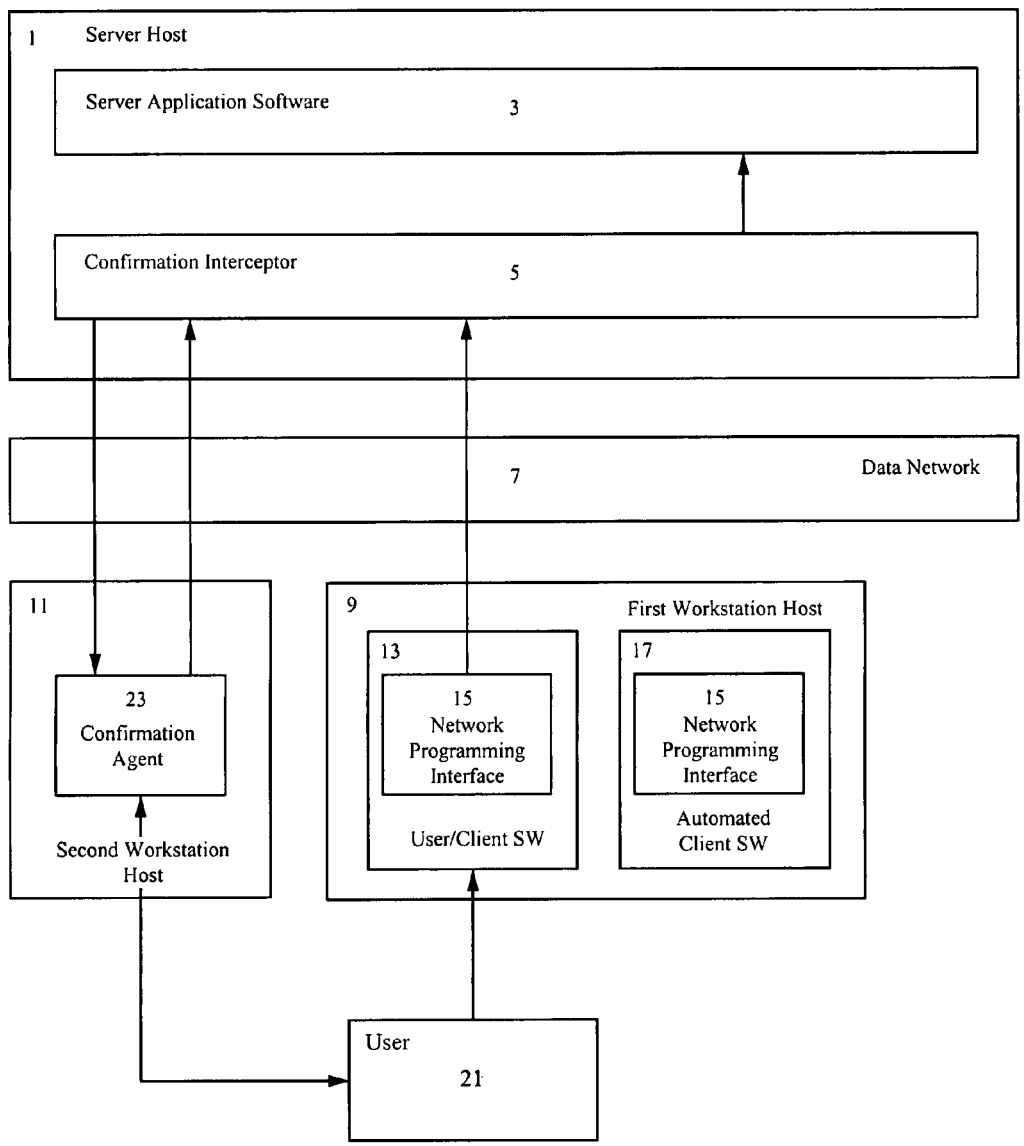
FIG. 3 is a block diagram comprising: a server host having server application software and a confirmation interceptor; a data network, a first workstation host having user/client software, and automated client software; a second workstation host having a confirmation agent; and a user, interacting in accordance to a second embodiment of the present invention.

FIG. 3 is a block diagram 300 in accordance to a second embodiment of the present invention. Block diagram 300 comprises: a server host denoted 1, a data network denoted 7, a first workstation host denoted 9, a second workstation host denoted 11, and a user denoted 21. The server host 1 further comprises server application software denoted 3 and a confirmation interceptor denoted 5. The first workstation host 9 further comprises: user/client software denoted 13, and automated client software denoted 17. The second workstation host 11 further comprises a confirmation agent 23. The user/client software 13 and the automated client software 17 each in turn comprise a network programming interface denoted 15.

As shown in FIG. 3, the server host 1, the server application software 3, the confirmation interceptor 5, the user/client software 13, the automated client software 17, the network programming interface 15, and the user 21 are substantially the same as they are illustrated and described in FIG. 1. However, whereas confirmation agent 19 is shown to operate on workstation host 9 in FIG. 1, the confirmation agent 23 in FIG. 3 is shown to operate on a second workstation host 11 that is associated with the same user 21. As with the embodiment illustrated in FIG. 1 and FIG. 2, the automated client software 17 may also originate a service request that is intercepted by the confirmation interceptor 5. However, the automated client software 17 shown in FIG. 3 is unable to see or intercept the confirmation request or user prompt since the confirmation request is directed not to the first workstation host denoted 9 on which the automated client software 17 executes, but instead to a second workstation host denoted 11.

Figure 4:
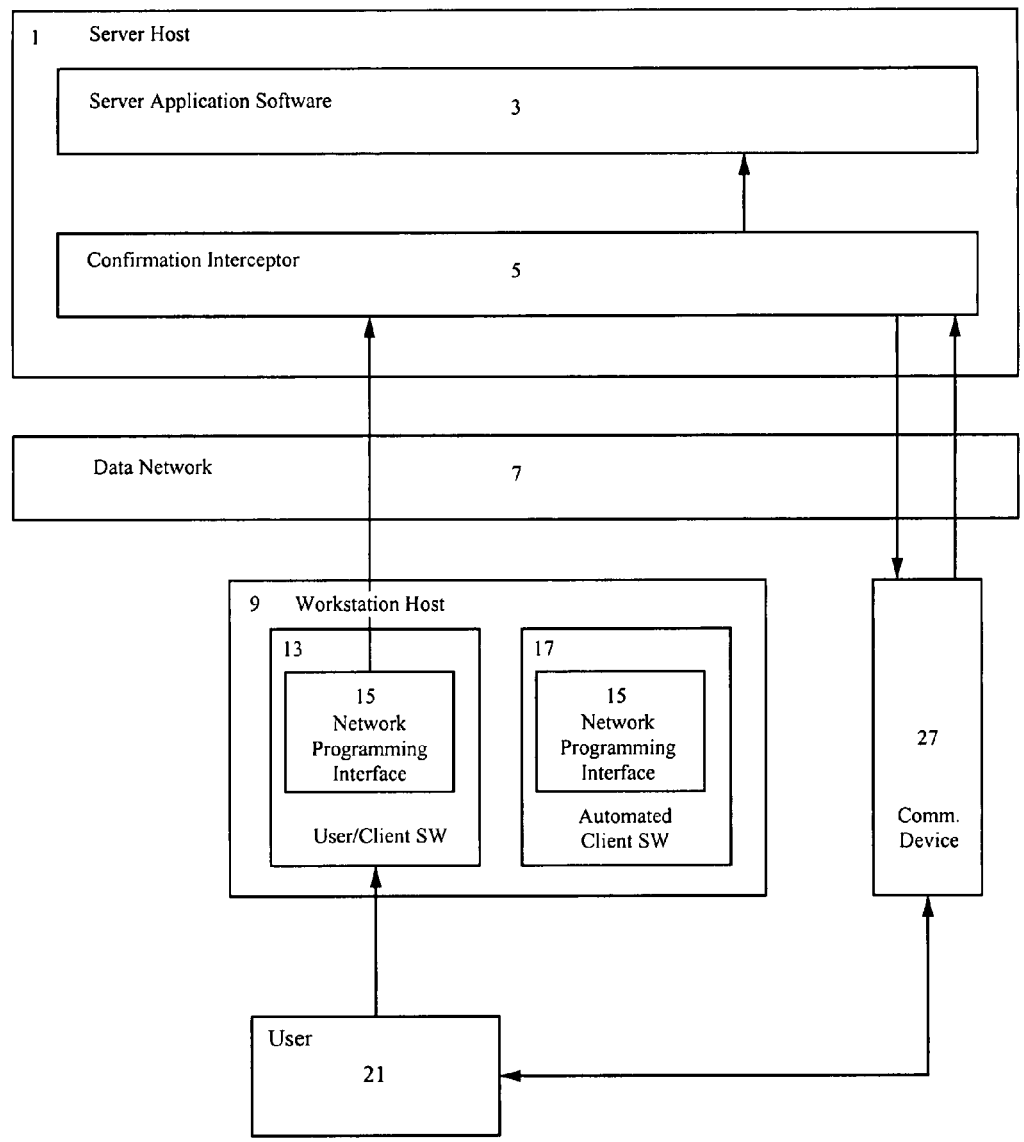
FIG. 4 is a block diagram comprising: a server host having server application software and a confirmation interceptor; a data network, a workstation host having user/client software, and automated client software; a user, and a communication device comprising a confirmation agent, on the same data network as the workstation host, interacting in accordance to a third embodiment of the present invention.

FIG. 4 is a block diagram 400 in accordance to a third embodiment of the present invention. Block diagram 400 comprises: a server host denoted 1, a data network denoted 7, a workstation host denoted 9, a communication device denoted 27 comprising a confirmation agent, and a user denoted 21. The server host 1 further comprises server application software denoted 3 and a confirmation interceptor denoted 5. The workstation host 9 further comprises: user/client software denoted 13, and automated client software denoted 17. The user/client software 13 and the automated client software 17 each in turn comprise a network programming interface denoted 15.

As shown in FIG. 4, the server host 1, the server application software 3, the confirmation interceptor 5, the user/client software 13, the automated client software 17, the network programming interface 15, and the user 21 are substantially the same as they are illustrated and described in FIG. 1. However, whereas the confirmation interceptor 5 is shown to send confirmation request messages to the confirmation agent 19 on workstation host 9, and receive confirmation status messages from the confirmation agent 19 in FIG. 1, the confirmation interceptor 5 in FIG. 4 is shown to send confirmation request messages to an alternative communication device 27 comprising a confirmation agent and receive confirmation status messages from the communication device 27, wherein the communication device 27 is on the same data network 7 but is not on workstation host 9. As with the embodiment illustrated in FIG. 1 and FIG. 2, the automated client software 17 may also originate a service request that is intercepted by the confirmation interceptor 5. However, the automated client software 17 shown in FIG. 4 is unable to see or intercept the confirmation request or user prompt, because the confirmation request is directed not to the first workstation host denoted 9 on which the automated client software 17 executes, but instead to the communication device 27.

Figure 5:
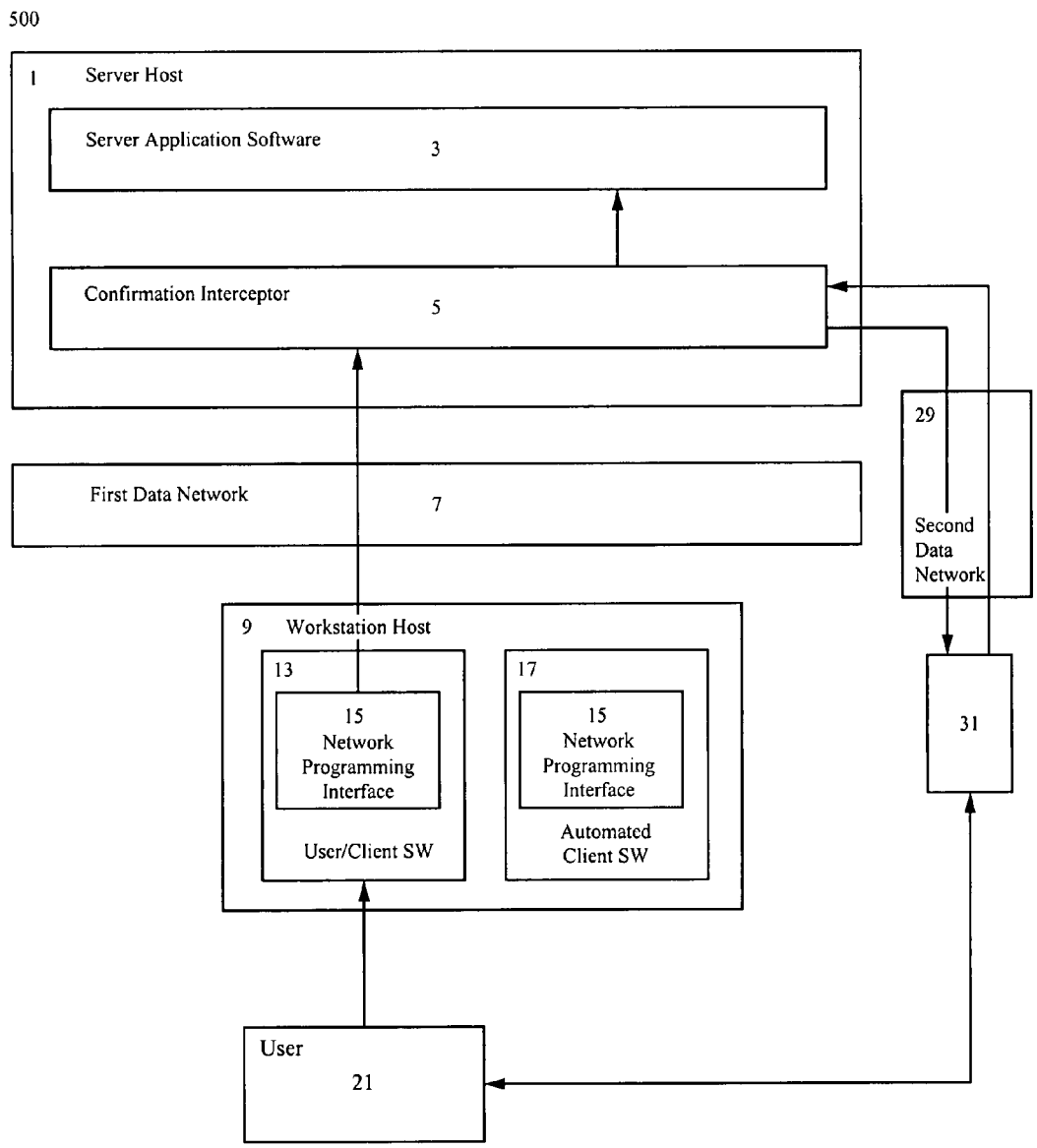
FIG. 5 is a block diagram comprising: a server host having server application software and a confirmation interceptor; a data network, a workstation host having user/client software, and automated client software; a user, a communication device comprising a confirmation agent, and a second data network, interacting in accordance to a fourth embodiment of the present invention.

FIG. 5 illustrates a block diagram 500 in accordance to a fourth embodiment of the present invention. Block diagram 500 comprises: a server host denoted 1, a first data network denoted 7, a workstation host denoted 9, a second data network denoted 29, a communication device denoted 31 comprising a confirmation agent, and a user denoted 21. The server host 1 further comprises server application software denoted 3 and a confirmation interceptor denoted 5. The workstation host 9 further comprises: user/client software denoted 13, and automated client software denoted 17. The user/client software 13 and the automated client software 17 each in turn comprise a network programming interface denoted 15.

As shown in FIG. 5, the server host 1, the server application software 3, the confirmation interceptor 5, the user/client software 13, the automated client software 17, the network programming interface 15, and the user 21 are substantially the same as they are illustrated and described in FIG. 1. However, whereas the confirmation interceptor 5 is shown to send confirmation request messages to the confirmation agent 19 implemented on workstation host 9, and receive confirmation status messages from the confirmation agent 19 in FIG. 1, the confirmation interceptor 5 in FIG. 5 is shown to send confirmation request messages to an alternative communication device 31 via a second data network 29, and receive confirmation status messages from the communication device 31 via the second data network 29. As with the embodiment illustrated in FIG. 1 and FIG. 2, the automated client software 17 may also originate a service request that is intercepted by the confirmation interceptor 5. However, the automated client software 17 shown in FIG. 5 is unable to see or intercept the confirmation request or user prompt, because the confirmation request is directed not to the first workstation host denoted 9 on which the automated client software 17 executes, but instead to the confirmation agent 31.

FIGS. 1 to 5 illustrate confirmation of explicit human input in accordance to several embodiments of the present invention. Moreover, the transactions between the elements shown in FIGS. 1 to 5 may be summarized into a log displayed to a human user such as a system administrator (not shown). In one exemplary embodiment, the log summary includes: the source and destination host addresses of the communication channel intercepted; protocol used to intercept communication (e.g. TCP, etc) including source and destination port numbers; host information for the confirmation interceptor; date and time of interception of transaction request message wherein the transaction requires confirmation; full or partial information related to the transaction request message; target device, communication channel, and protocols used by the confirmation interceptor to attempt contact with the confirmation agent (e.g. target host, protocol, port usage, type of network, network-specific target identifier such as a phone number, etc.); whether communication succeeded, failed, or timed out; and a log of communication with confirmation agent including: any local context provided by the confirmation agent to the confirmation interceptor, type of confirmation request sent; full log of confirmation requests sent to the confirmation agent; full log of response information gathered from human-machine interaction; whether response information was correct confirmation response; date and time of forwarded requests if response information was correct; actions taken if response information was incorrect.

Figure 6:
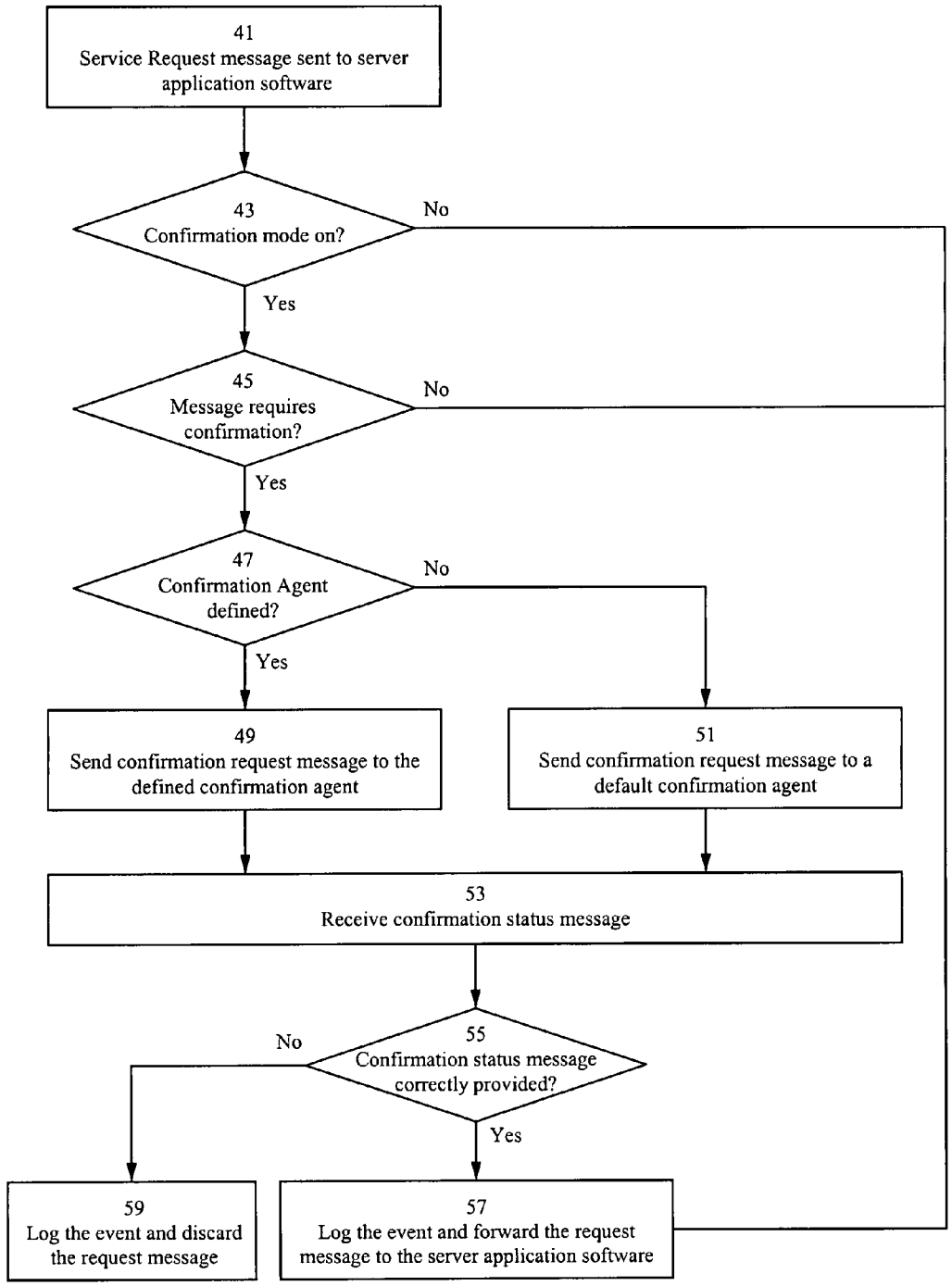
FIG. 6 is a flow chart illustrating the steps for containing networked application client software in accordance to one embodiment of the present invention.

FIG. 6 is a flow chart illustrating the steps for containing networked application client software in accordance to one embodiment of the present invention. In step 41, a service request message is sent to server application software. As illustrated by the embodiments shown in FIG. 1-FIG. 5, the service request message may originate from a user or may originate from automated client software as shown in FIG. 2.

Moreover, a system in accordance with the present invention may operate in different modes wherein in a first exemplary embodiment, the system operates without user confirmation for service requests.

In this first exemplary embodiment, the service request is logged and the service request message is forwarded onto the server application software in step 57.

In an alternative embodiment, the system operates with user confirmation for service requests. In this alternative embodiment, the service request message is checked to determine whether the message requires a user confirmation in step 45. If the service request message does not require any user confirmation, the service request is logged and the service request message is forwarded onto the server application software in step 57.

In step 45, if it is determined that the service request message does require user confirmation, the message is checked to determine if a specific confirmation agent has been defined as the means to process the service request in step 47.

In step 49, if a confirmation agent has been designated to process the service request, a confirmation request message is then sent to the designated confirmation agent from a confirmation interceptor.

Alternatively, in step 51, if a confirmation agent is not designated to process the service request, a confirmation request message is sent to a default confirmation agent from a confirmation interceptor.

Having received the confirmation request message, the designated or default confirmation agent engages in a dialogue with the user in order to obtain user confirmation, and the designated or default confirmation agent subsequently sends a confirmation status message to the confirmation interceptor, wherein the confirmation status message comprises the content of the user's dialogue information. Moreover, the confirmation status message may comprise: a) an acceptable user response wherein the response is one that is required for the service request, b) an unacceptable user response, or c) no user response wherein the user does not respond within a user or system defined time frame. Case (b) may comprise a well-formed response wherein the user denies the service request, or it may comprise a malformed response such as the result of autonomous client software attempting to impersonate a user.

Furthermore, one or more techniques maybe employed to carry out the dialogue with the user in order to ensure that the response comes from a legitimate user rather than other means such as automation. In one embodiment, a natural language puzzle maybe used wherein human reasoning is necessary to determine the input solicited. For example, one dialogue employing natural language puzzles may solicit an input by asking for the name of a color in the rainbow, wherein the color is adjacent to the color yellow in the rainbow and is not a citrus fruit. The nature of such questions enables a higher probability of explicit user confirmation due to the current inability of software automation to perform human reasoning.

In a second embodiment, the dialogue is presented via a graphical representation of letters that are known to be difficult for optical character recognition. By presenting text as graphics rather than textual data, software automation would be forced to infer the text from the graphical representation of letters and words. In one example, the dialogue may solicit an input with a request such as "to confirm this operation, please type green". Alternatively, the response may be solicited as selection of graphical items that represent letters or words, thus forming a "virtual keypad".

In a third embodiment, the dialogue presents a challenge/response request where the request must be computed by using the challenge data in addition to information that the human knows and is not on the computer the user is using. For example, a "2 factor authentication" may be used wherein a separate handheld device is employed to compute the response.

In a fourth embodiment, the interface between the human user and the machine is implemented entirely on a separate device from the workstation the user is using. For example, confirmation may be solicited via a short messaging system to a designated cell phone so that the workstation the user is using would have no information regarding the response solicited. The separate device could be on a different communication network as in the embodiment illustrated in FIG. 5 with the alternative network 29 being a short messaging system network and the confirmation agent 31 being a cell phone. The separate device could alternatively be on the same network as the workstation host 9 in FIG. 4 (e.g. a personal digital assistant connected to the network via 802.11 wireless networking) or could be another workstation associated with the same user 21 shown in FIG. 3.

Referring now back to FIG. 6. In step 53, the confirmation interceptor receives the confirmation status message from either the designated confirmation agent or from the default confirmation agent, and subsequently determines whether or not the response was from a legitimate user. Moreover, the lack of a user response is equivalent to a lack of confirmation for the service request.

In step 59, if the confirmation interceptor determines that the user has denied the service request, the service request is logged but the service request message is not forwarded to the server application software. Conversely, in step 57, if the confirmation interceptor determines that the user has confirmed the service request, the service request is logged and the service request message is forwarded to the server application software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the Claims appended hereto and their equivalents.

For example, the confirmation interceptor 5 is illustrated in FIG. 1-FIG. 5 as an element of the server host 1. In a first alternative embodiment, the confirmation interceptor 5 is implemented on a second server host. In this first alternative embodiment, the confirmation interceptor intercepts communication from the server host 1 by redirecting communication from the server host 1 to the second server host. In a second alternative embodiment, the confirmation interceptor is software running on the workstation. In this second embodiment, the interceptor intercepts outgoing communication and gets confirmation for those transactions that require confirmation by contacting the confirmation agent using local host communication means. In a third alternative embodiment, the confirmation interceptor is embedded in a network device such as a switch or a router, wherein the network device is part of the communication path to and from the server host. In this third alternative embodiment, communication is intercepted when it passes through the network device in which the confirmation interceptor is embedded.

Moreover, the confirmation agents such as confirmation agent 19 and confirmation agent 23 may be implemented as special purpose software or existing communication software such as an email client or instant messaging client. The confirmation agent may be implemented using alternative communication devices such as handheld computers, personal digital assistants, 2-way pagers, cell phones, etc. Depending on the device in which a confirmation agent is implemented, the agent may be specific software or confirmation from the user may be solicited by using the native capabilities of the device. For example, telephone confirmation may be obtained via a phone call, the input would then be prompted as a voice response.

We claim:

1. A method comprising:
   intercepting a service request at a confirmation interceptor;
   sending a confirmation request to a user via a confirmation agent, wherein the confirmation request comprises one or more dialogues configured to require human participation by the user, wherein a selected one of the dialogues involving the confirmation request includes a short message service interaction with the user via a communication device that is separate from a host computer, wherein the host computer includes a software agent that originated the service request;
   receiving, from the communication device, a confirmation status message at the confirmation interceptor, wherein the confirmation status message is in response to the confirmation request; and
   determining acceptability of the confirmation status message, wherein the service request is associated with a destination other than the confirmation interceptor, and wherein if the status message is unacceptable, usage of a communication conduit associated with a port of the host computer is limited such that e-mail messages cannot be communicated by the host computer.

2. The method of claim 1, after the intercepting step, further comprising the steps of determining if a confirmation mode is on.

3. The method of claim 2, wherein the confirmation mode is on.

4. The method of claim 3, further comprising the step of determining if the service request requires confirmation of explicit human input.

5. The method of claim 4, wherein the service request does require confirmation of explicit human input.

6. The method of claim 5, wherein the confirmation request is sent to a defined confirmation agent.

7. The method of claim 5, wherein the confirmation request is sent to a default confirmation agent.

8. The method of claim 2, wherein the confirmation mode is not on.

9. The method of claim 8, further comprising the step of forwarding the service request from the confirmation interceptor.

10. The method of claim 1, wherein the confirmation status message is acceptable.

11. The method of claim 10, further comprising the step of forwarding the service request from the confirmation interceptor.

12. The method of claim 1, wherein the confirmation status message is unacceptable.

13. The method of claim 12, further comprising the step of discarding the service request at the confirmation interceptor.

14. The method of claim 1, wherein the acceptability of the confirmation status message is determined by comparing the confirmation status message to an expected response.

15. The method of claim 1, wherein the confirmation agent is separate from a source generating the service request.

16. The method of claim 1, wherein at least one of the dialogues includes a natural language puzzle to be successfully answered with human reasoning in order to satisfy the service request.

17. A system contained by verification of explicit human input, the system comprises:
   a server host having server application software;
   a confirmation interceptor connected to the server application software, wherein the confirmation interceptor intercepts a service request and receives a confirmation status;
   a workstation having user/client software connected to the confirmation interceptor, wherein the user/client software sends the service request to the server application software;
   a confirmation agent connected bi-directionally to the confirmation interceptor; and
   a user connected bi-directionally to the confirmation agent and connected to the user/client software, wherein the confirmation agent sends a confirmation request to the user and the confirmation status based on a response from the user to the confirmation interceptor to determine acceptability of the confirmation status, further wherein the confirmation request comprises one or more dialogues configured to require human participation by the user, wherein a selected one of the dialogues involving the confirmation request includes a short message service interaction with the user via a communication device that includes the confirmation agent, wherein the communication device is separate from the workstation, wherein the service request is associated with a destination other than the confirmation interceptor, and wherein if the confirmation status is unacceptable, usage of a communication conduit associated with a port of the workstation is limited such that e-mail messages cannot be communicated by the workstation.

18. The system of claim 17, wherein the user/client software further comprises a network programming interface.

19. The system of claim 17, further comprising a data network through which the user/client software and the confirmation agent connect to the confirmation interceptor.

20. The system of claim 17, wherein the confirmation interceptor is implemented on the server host.

21. The system of claim 17, wherein the confirmation interceptor is implemented on a second server host.

22. The system of claim 17, wherein the confirmation interceptor is implemented in a network device, wherein the network device is part of any communication path to and from the server host.

23. The system of claim 17, wherein the confirmation interceptor is implemented on the workstation.

24. The system of claim 17, wherein the confirmation agent is special-purpose software customized for containing the system.

25. The system of claim 17, wherein the confirmation agent is commercially available communication software.

26. The system of claim 17, wherein the confirmation agent is a separate application from the user/client software generating the service request.

27. The system of claim 17, wherein at least one of the dialogues includes a natural language puzzle to be successfully answered with human reasoning in order to satisfy the service request.

28. A system contained by verification of explicit human input, the system comprises:
   a server host having server application software;
   a confirmation interceptor connected to the server application software, wherein the confirmation interceptor intercepts a service request and receives a confirmation status;
   a first workstation host having user/client software connected to the confirmation interceptor, wherein the user/client software sends the service request to the server application software;
   a second workstation host having a confirmation agent connected bi-directionally to the confirmation interceptor; and
   a user connected bi-directionally to the confirmation agent and connected to the user/client software, wherein the confirmation agent sends a confirmation request to the user and the confirmation status based on a response from the user to the confirmation interceptor to determine acceptability of the confirmation status, further wherein the confirmation request comprises one or more dialogues configured to require human participation by the user, wherein a selected one of the dialogues involving the confirmation request includes a short message service interaction with the user via the second workstation host that is separate from the first workstation host, wherein the service request is associated with a destination other than the confirmation interceptor, and wherein if the confirmation status is unacceptable, usage of a communication conduit associated with a port of the first workstation host is limited such that e-mail messages cannot be communicated by the first workstation host.

29. The system of claim 28, wherein the user/client software further comprises a network programming interface.

30. The system of claim 28, further comprising a data network through which the user/client software and the confirmation agent connect to the confirmation interceptor.

31. The system of claim 28, wherein the confirmation interceptor is implemented on the server host.

32. The system of claim 28, wherein the confirmation interceptor is implemented on a second server host.

33. The system of claim 28, wherein the confirmation interceptor is implemented in a network device, wherein the network device is part of any communication path to and from the server host.

34. The system of claim 28, wherein the confirmation interceptor is implemented on the first workstation host.

35. The system of claim 28, wherein the confirmation agent is special-purpose software customized for containing the system.

36. The system of claim 28, wherein the confirmation agent is commercially available communication software.

37. The system of claim 28, wherein the confirmation agent is a communication device.

38. The system of claim 28, wherein at least one of the dialogues includes a natural language puzzle to be successfully answered with human reasoning in order to satisfy the service request.

39. A system contained by verification of explicit human input, the system comprises:
   a server host having server application software;
   a confirmation interceptor connected to the server application software, wherein the confirmation interceptor intercepts a service request and receives a confirmation status;
   a workstation host having user/client software connected to the confirmation interceptor, wherein the user/client software sends the service request to the server application software; and a confirmation agent connected bi-directionally to the confirmation interceptor, wherein the confirmation agent sends a confirmation request to a user and the confirmation status based on a response from the user to the confirmation interceptor to determine acceptability of the confirmation status, further wherein the user is connected bi-directionally to the confirmation agent and is connected to the user/client software, further wherein the confirmation request comprises one or more dialogues configured to require human participation by the user, wherein a selected one of the dialogues involving the confirmation request includes a short message service interaction with the user via a communication device that includes the confirmation agent, wherein the communication device is separate from the workstation host, wherein the service request is associated with a destination other than the confirmation interceptor, and wherein if the confirmation status is unacceptable, usage of a communication conduit associated with a port of the workstation host is limited such that e-mail messages cannot be communicated by the workstation host.

40. The system of claim 39, wherein the user/client software further comprises a network programming interface.

41. The system of claim 39, further comprising a data network through which the user/client software and the confirmation agent connect to the confirmation interceptor.

42. The system of claim 39, wherein the confirmation interceptor is implemented on the server host.

43. The system of claim 39, wherein the confirmation interceptor is implemented on a second server host.

44. The system of claim 39, wherein the confirmation interceptor is implemented in a network device, wherein the network device is part of any communication path to and from the server host.

45. The system of claim 39, wherein the confirmation interceptor is implemented on the workstation host.

46. The system of claim 39, wherein the confirmation agent is special-purpose software customized for containing the system.

47. The system of claim 39, wherein the confirmation agent is commercially available communication software.

48. The system of claim 39, wherein at least one of the dialogues includes a natural language puzzle to be successfully answered with human reasoning in order to satisfy the service request.

49. A system contained by verification of explicit human input, the system comprises:
a server host having server application software;
a confirmation interceptor connected to the server application software, wherein the confirmation interceptor intercepts a service request and receives a confirmation status;
a workstation host having user/client software connected to the confirmation interceptor, wherein the user/client software sends the service request to the server application software;
a first data network through which the user/client software connects to the confirmation interceptor;
a confirmation agent connected bi-directionally to the confirmation interceptor;
a second data network through which the confirmation agent connects to the confirmation interceptor; and
a user connected bi-directionally to the confirmation agent and connected to the user/client software, wherein the confirmation agent sends a confirmation request to the user and the confirmation status based on a response from the user to the confirmation interceptor to determine acceptability of the confirmation status, further wherein the confirmation request comprises one or more dialogues configured to require human participation by the user, wherein a selected one of the dialogues involving the confirmation request includes a short message service interaction with the user via a communication device that includes the confirmation agent, wherein the communication device is separate from the workstation host, wherein the service request is associated with a destination other than the confirmation interceptor, and wherein if the confirmation status is unacceptable, usage of a communication conduit associated with a port of the workstation host is limited such that e-mail messages cannot be communicated by the workstation host.

50. The system of claim 49, wherein the user/client software further comprises a network programming interface.

51. The system of claim 49, wherein the confirmation interceptor is implemented on the server host.

52. The system of claim 49, wherein the confirmation interceptor is implemented on a second server host.

53. The system of claim 49, wherein the confirmation interceptor is implemented in a network device, wherein the network device is part of any communication path to and from the server host.

54. The system of claim 49, wherein the confirmation interceptor is implemented on the workstation host.

55. The system of claim 49, wherein the confirmation agent is special-purpose software customized for containing the system.

56. The system of claim 49, wherein the confirmation agent is commercially available communication software.

57. The system of claim 49, wherein the confirmation agent is a separate application from the user/client software generating the service request.

58. The system of claim 49, wherein at least one of the dialogues includes a natural language puzzle to be successfully answered with human reasoning in order to satisfy the service request.

59. A system contained by verification of explicit human input, the system comprises:
a server host having server application software;
a confirmation interceptor connected to the server application software, wherein the confirmation interceptor intercepts a service request and receives a confirmation status;
a first workstation host having user/client software connected to the confirmation interceptor, wherein the user/client software sends the service request to the server application software;
a second workstation host having a confirmation agent connected bi-directionally to the confirmation interceptor;
a user connected bi-directionally to the confirmation agent and connected to the user/client software, wherein the confirmation agent sends a confirmation request to the user and the confirmation status based on a response from the user to the confirmation interceptor to determine acceptability of the confirmation status, further wherein the confirmation request comprises one or more dialogues configured to require human participation by the user, wherein a selected one of the dialogues involving the confirmation request includes a short message service interaction between the user via device the second workstation host that is separate from the first workstation host; and
an interface connected to the confirmation interceptor, wherein the interface logs interactive events between the confirmation interceptor, the confirmation agent, and the user in a log summary, wherein the service request is associated with a destination other than the confirmation interceptor, and wherein if the confirmation status is unacceptable, usage of a communication conduit associated with a port of the first workstation host is limited such that e-mail messages cannot be communicated by the first workstation host.

60. The system of claim 59 wherein the log summary comprises address information, protocol information, host information, date and time information and status information.

61. The system of claim 59 wherein the log summary comprises a source host address of a communication channel intercepted, a destination host address of the communication channel intercepted, a protocol used to intercept the service request, host information for the communication interceptor, date and time data of interception of the service request, service request message information, a confirmation agent communication log and a communication status.

62. The system of claim 59, wherein the confirmation agent is a separate application from the user/client software generating the service request.

63. The system of claim 59, wherein at least one of the dialogues includes a natural language puzzle to be successfully answered with human reasoning in order to satisfy the service request.

* * * * *